US011162597B2

(12) United States Patent
Watanabe et al.

(10) Patent No.: US 11,162,597 B2
(45) Date of Patent: Nov. 2, 2021

(54) FLOW PATH ASSEMBLY AND VALVE DEVICE

(71) Applicant: FUJIKIN INCORPORATED, Osaka (JP)

(72) Inventors: Kazunari Watanabe, Osaka (JP); Kohei Shigyou, Osaka (JP); Kenji Aikawa, Osaka (JP); Tomohiro Nakata, Osaka (JP); Takahiro Matsuda, Osaka (JP); Tsutomu Shinohara, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 15 days.

(21) Appl. No.: 16/757,172

(22) PCT Filed: Oct. 24, 2018

(86) PCT No.: PCT/JP2018/039424
§ 371 (c)(1),
(2) Date: Apr. 17, 2020

(87) PCT Pub. No.: WO2019/087879
PCT Pub. Date: May 9, 2019

(65) Prior Publication Data
US 2020/0340591 A1    Oct. 29, 2020

(30) Foreign Application Priority Data

Oct. 31, 2017    (JP) .............................. JP2017-210423

(51) Int. Cl.
*F16K 7/16*        (2006.01)
*F16K 27/02*       (2006.01)

(52) U.S. Cl.
CPC ............ *F16K 7/16* (2013.01); *F16K 27/0236* (2013.01)

(58) Field of Classification Search
USPC .................................................. 251/365, 358
See application file for complete search history.

(56) References Cited

U.S. PATENT DOCUMENTS

| 4,137,267 A | 1/1979 | Reid et al. | |
|---|---|---|---|
| 2005/0109967 A1* | 5/2005 | Ohmi | F16K 27/00 251/127 |

(Continued)

FOREIGN PATENT DOCUMENTS

| CN | 1359454 A | 7/2002 |
|---|---|---|
| CN | 102691810 A | 9/2012 |

(Continued)

OTHER PUBLICATIONS

International Search Report issued in International Pat. Appl. No. PCT/JP2018/039424, dated Jan. 29, 2019 with English Translation.

(Continued)

*Primary Examiner* — Daphne M Barry
(74) *Attorney, Agent, or Firm* — Greenblum & Bernstein, P.L.C.

(57) ABSTRACT

A flow path assembly incorporating functional components, such as orifices and filters, is provided in which gaps between the functional components and the flow path components defining the flow path are sealed for an extended period of time. An annular elastic member interposed between the flow path members is provided outside the opposing surfaces of the flow path members, the flow path member has a caulking portion, the caulking portion integrates the flow path members and the plate-like member, exerts a force on the flow path member such that one of the opposing surfaces faces the other of the opposing surfaces, seals the gaps between the orifice plate and the opposing (Continued)

surfaces, and the elastic member is crushed between the flow path members to seal the gap between the flow path members.

7 Claims, 12 Drawing Sheets

(56) References Cited

U.S. PATENT DOCUMENTS

| 2012/0241024 A1 | 9/2012 | Arai et al. |
| 2015/0034178 A1* | 2/2015 | Vasquez ............. G05D 16/0633 137/471 |

FOREIGN PATENT DOCUMENTS

| CN | 104482276 A | 4/2015 |
| JP | 08-244578 A | 9/1996 |
| JP | 2003-090435 A | 3/2003 |
| JP | 2007-003013 A | 1/2007 |
| JP | 2010-190430 A | 9/2010 |
| WO | 2018/021277 A1 | 2/2018 |

OTHER PUBLICATIONS

International Preliminary Report on Patentability issued in International Pat. Appl. No. PCT/JP2018/039424, dated May 5, 2020 with English Translation.
Chinese Office Action, Chinese Patent Office, Application No. 201880071418.8, dated Feb. 20, 2021.

* cited by examiner

[fig.1A]
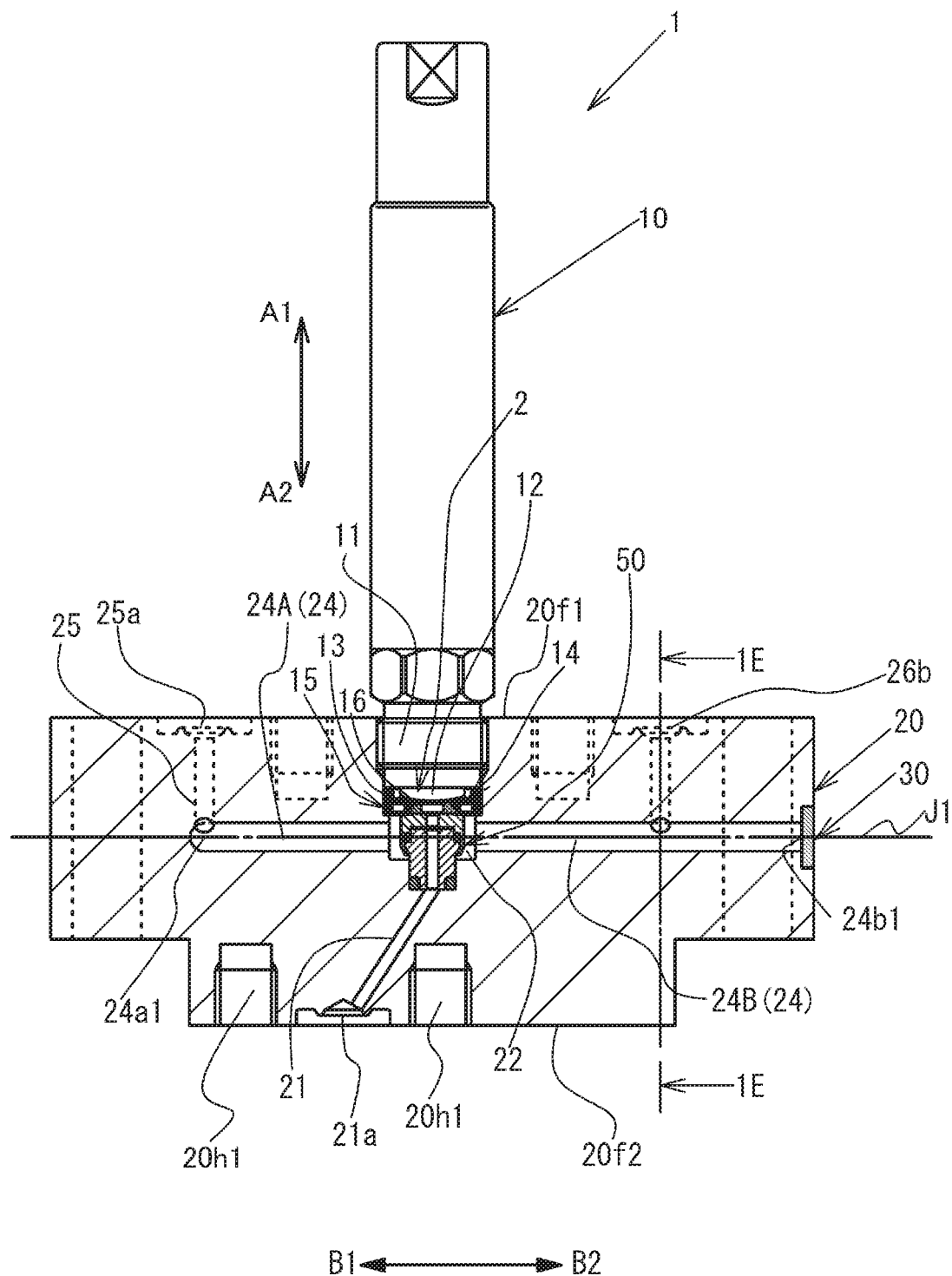

[fig.1B]
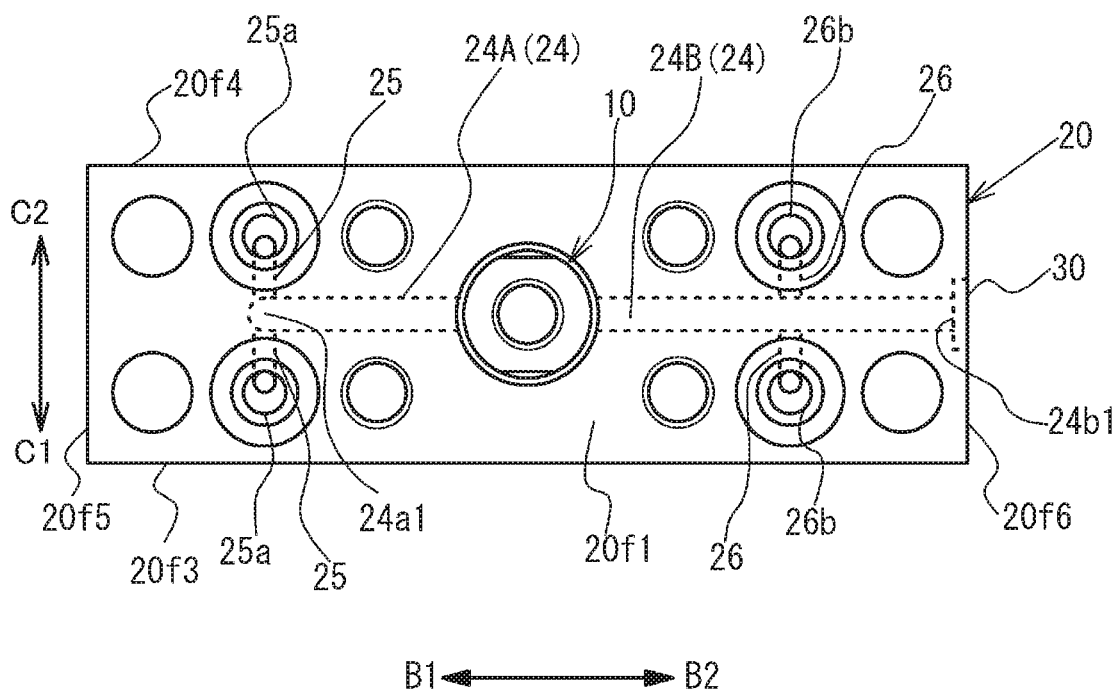
[fig.1C]
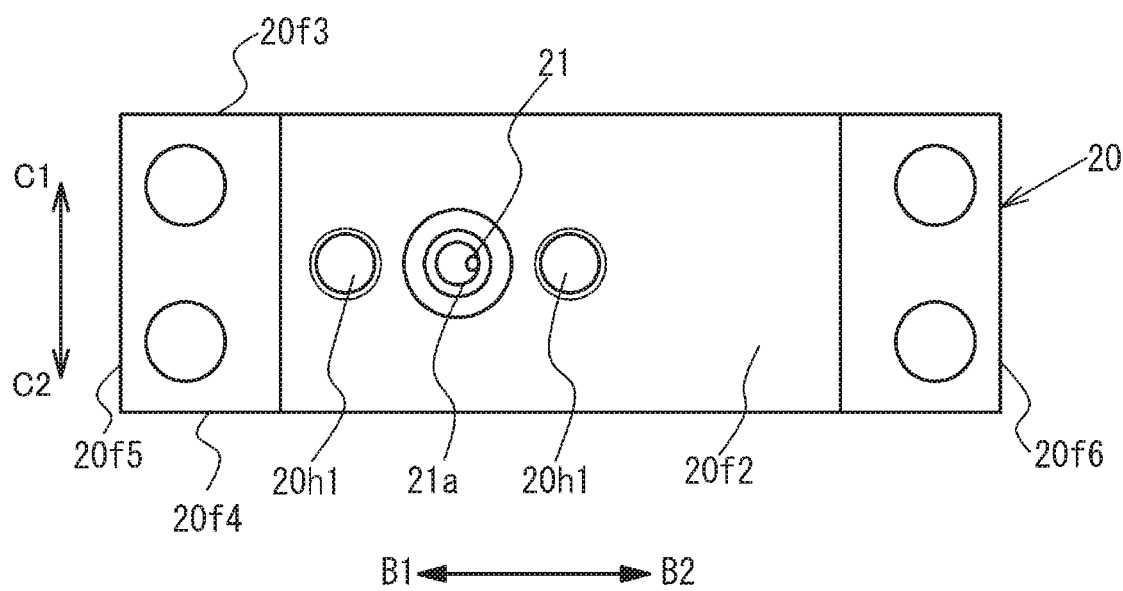

[fig.1D]
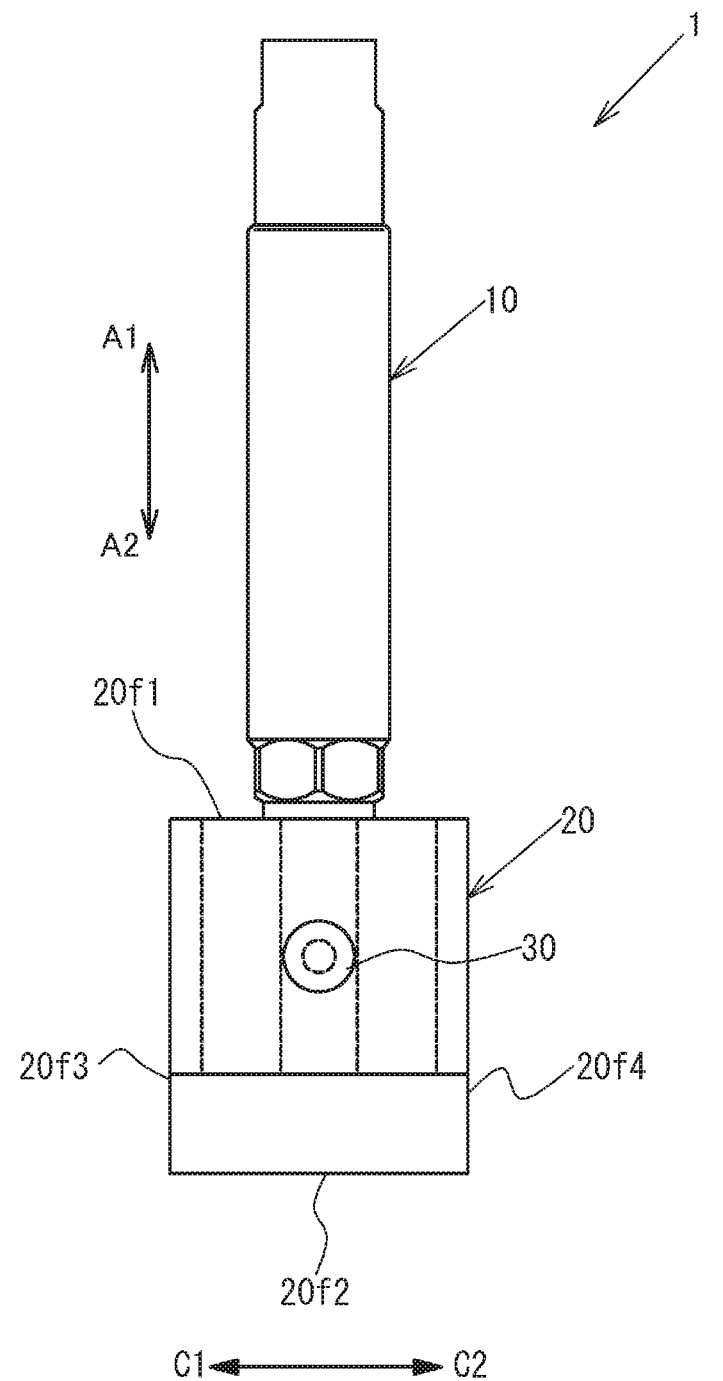

[fig.2]
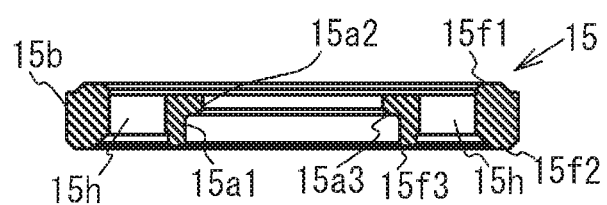
[fig.3]
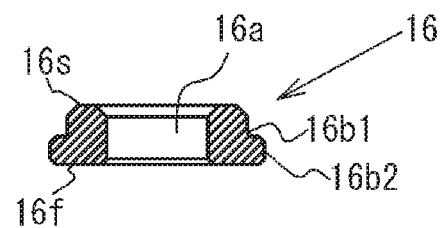

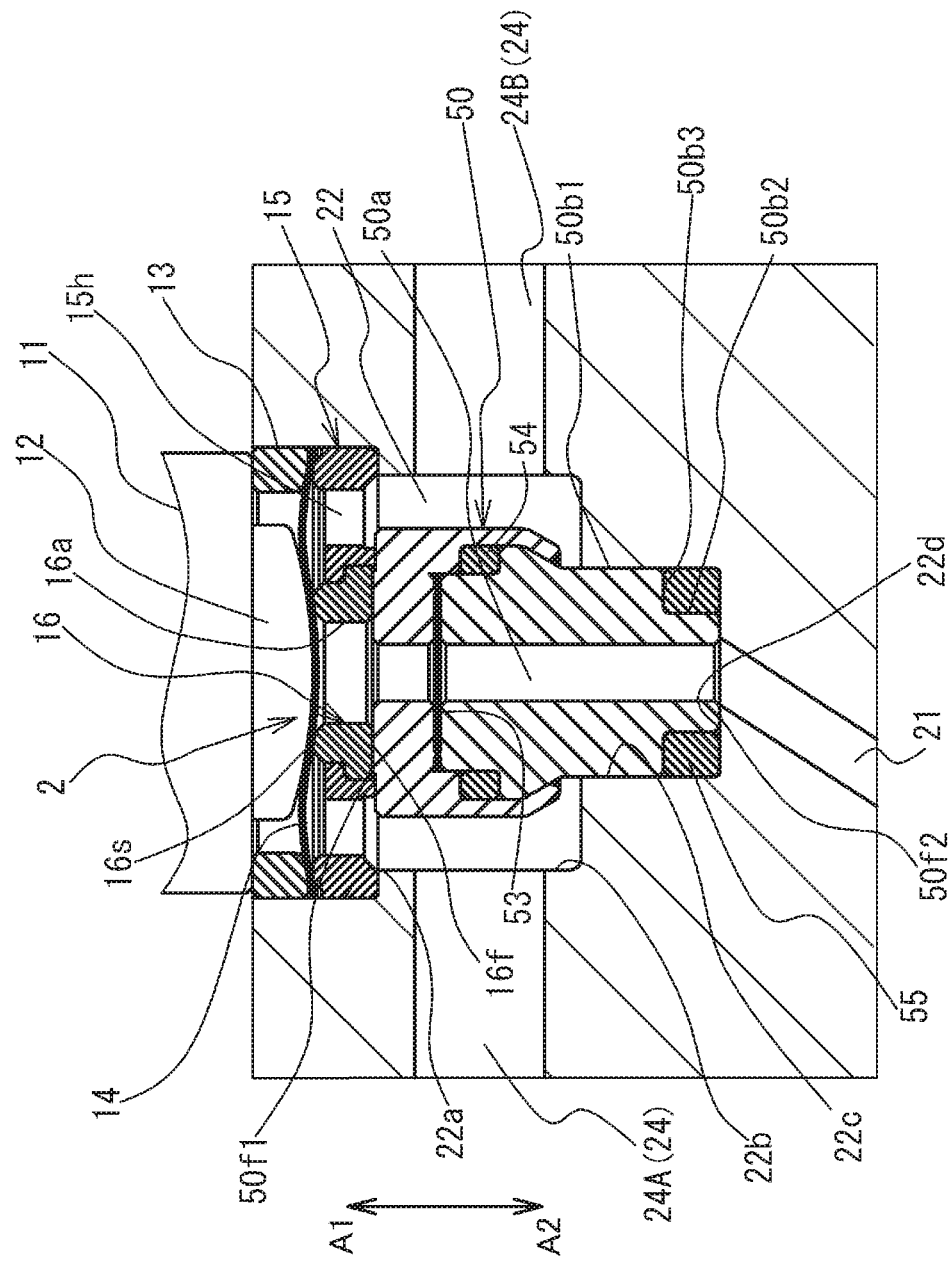

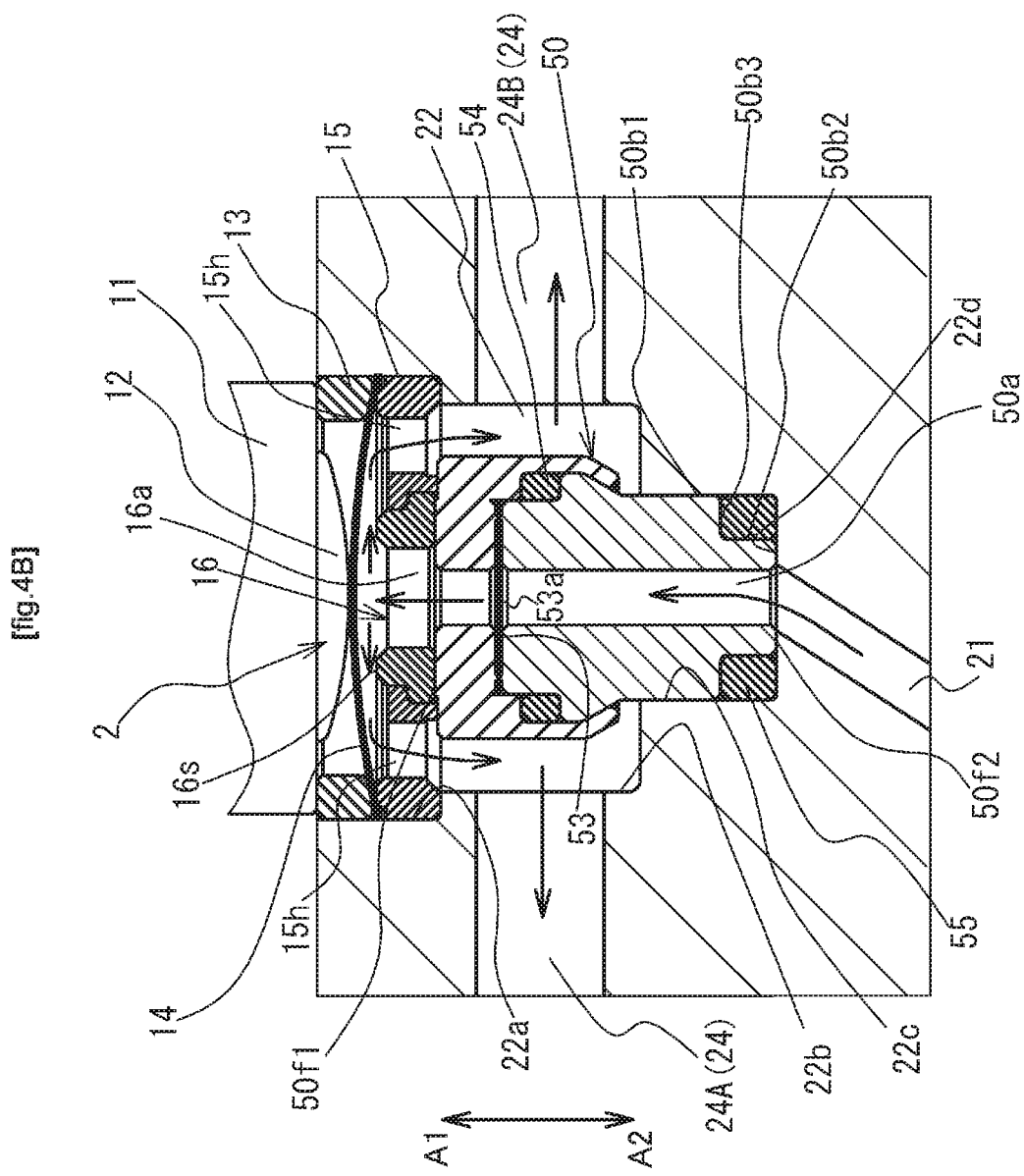
[fig.4B]

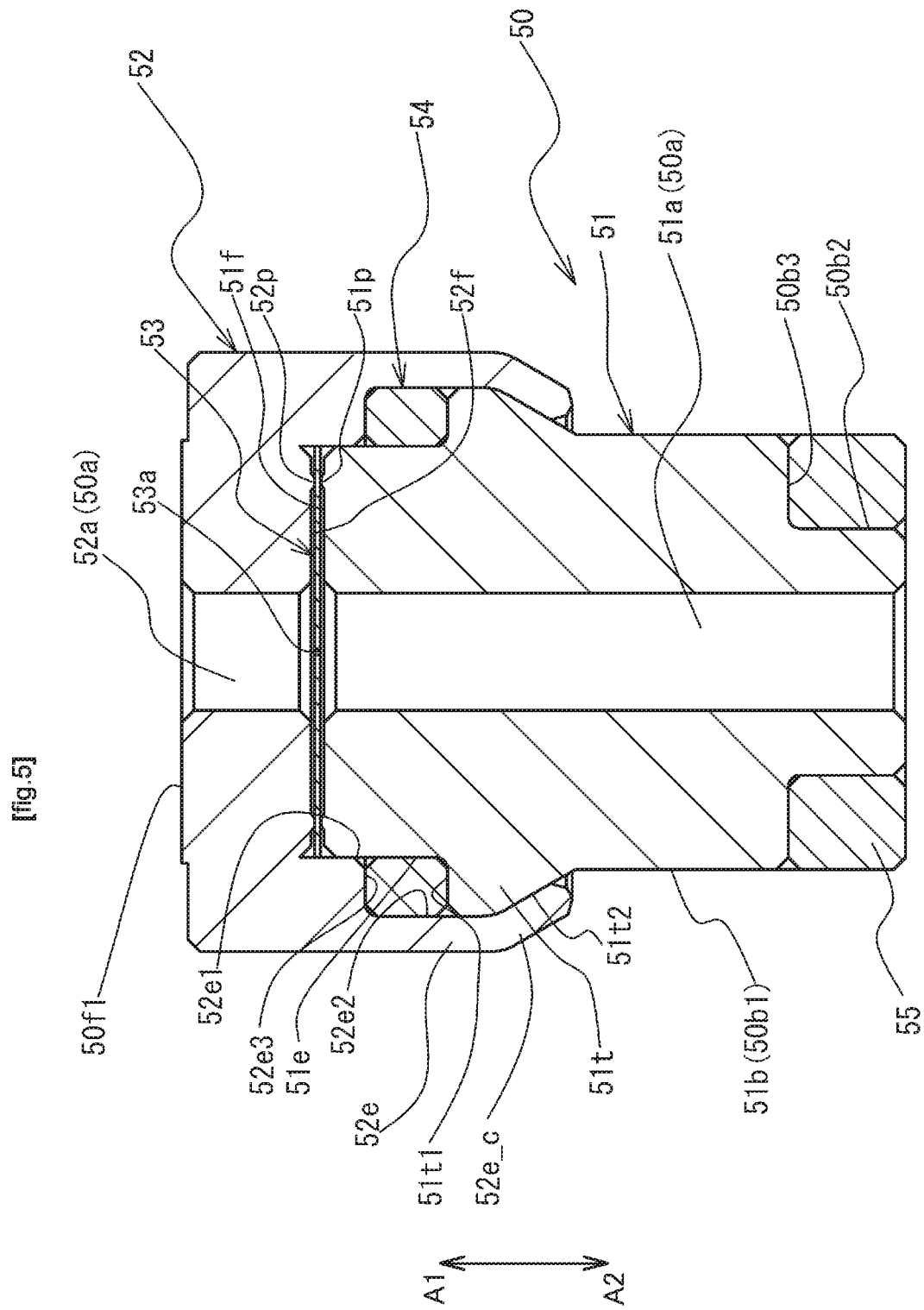
[Fig.5]

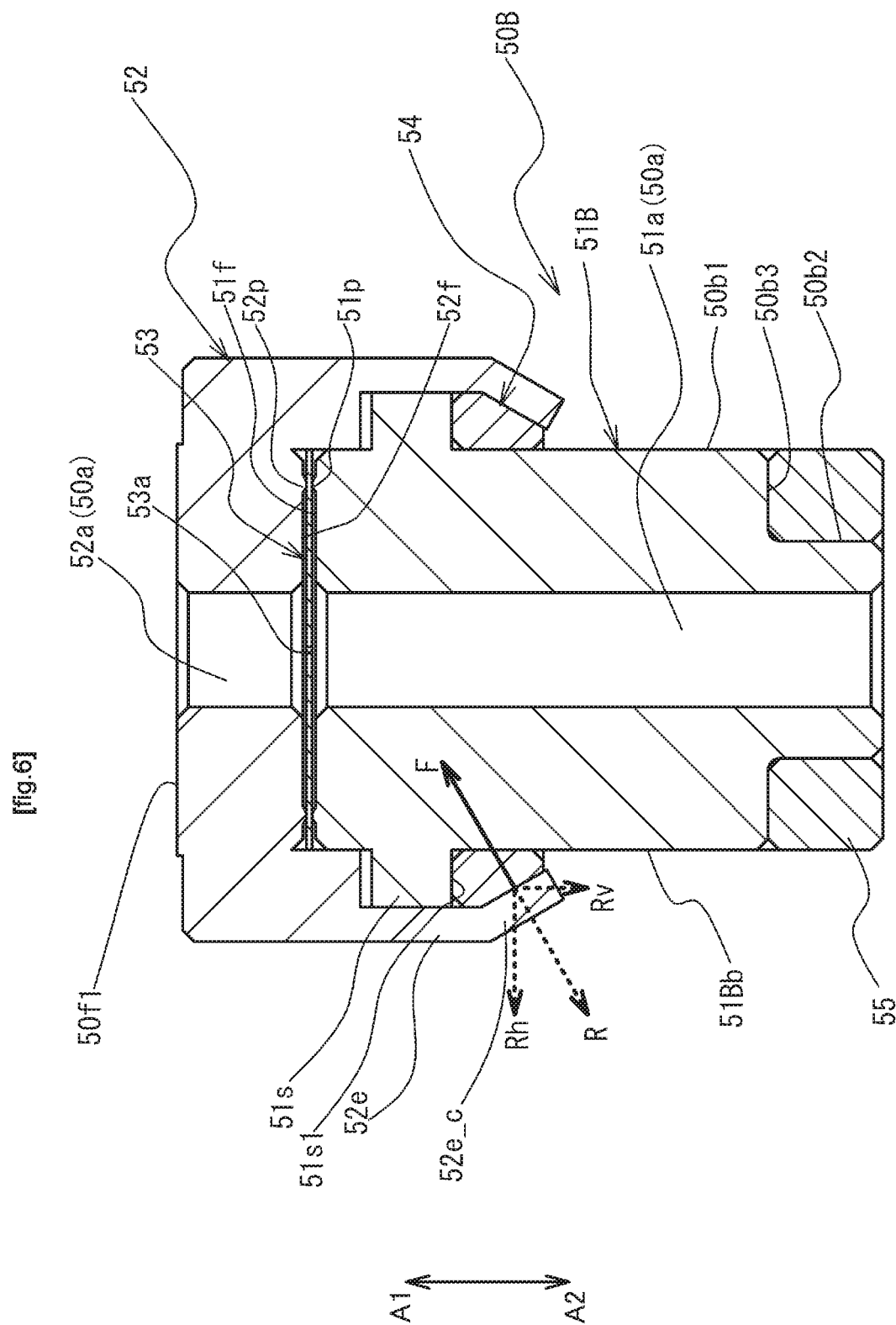

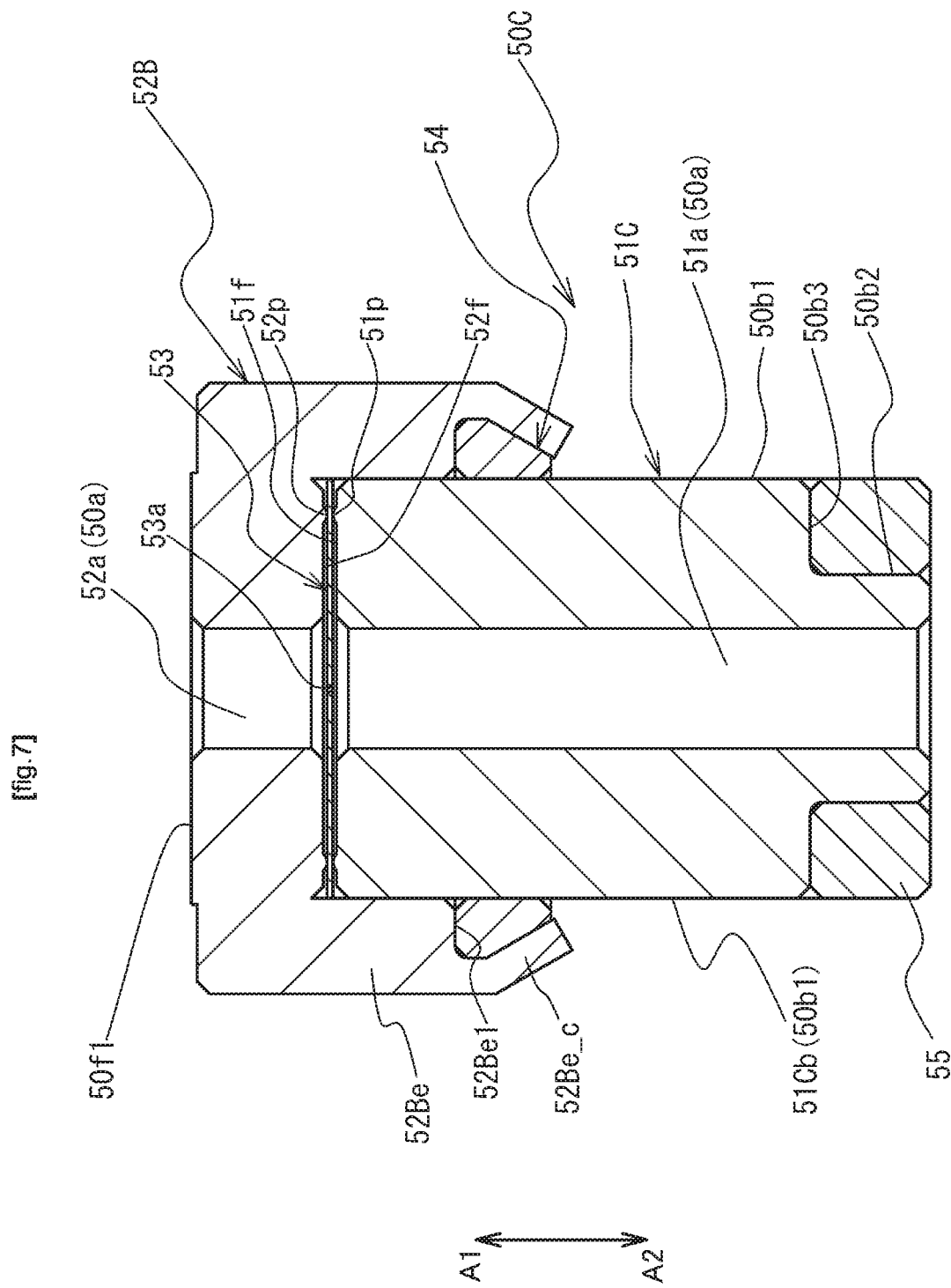

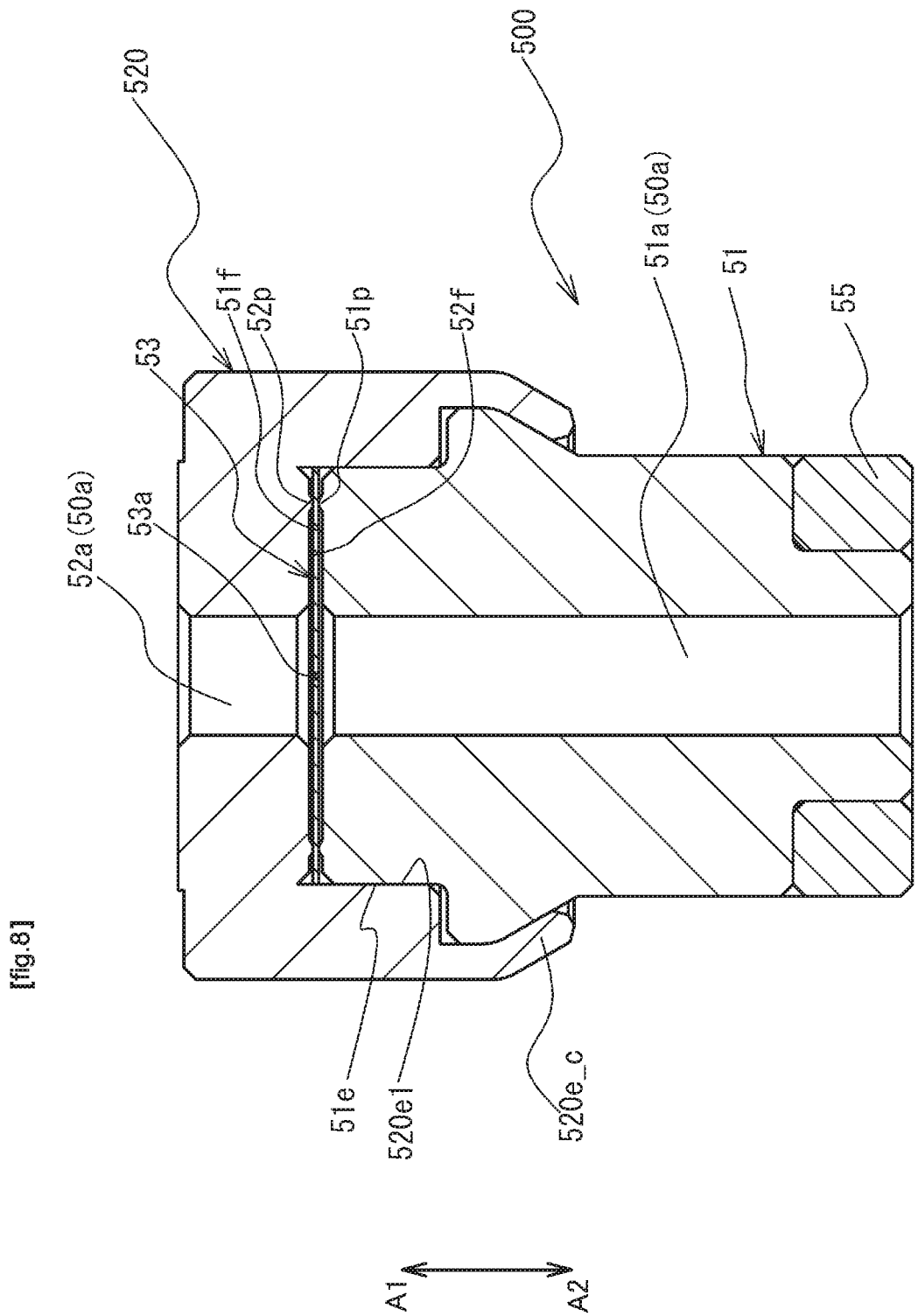
[fig.8]

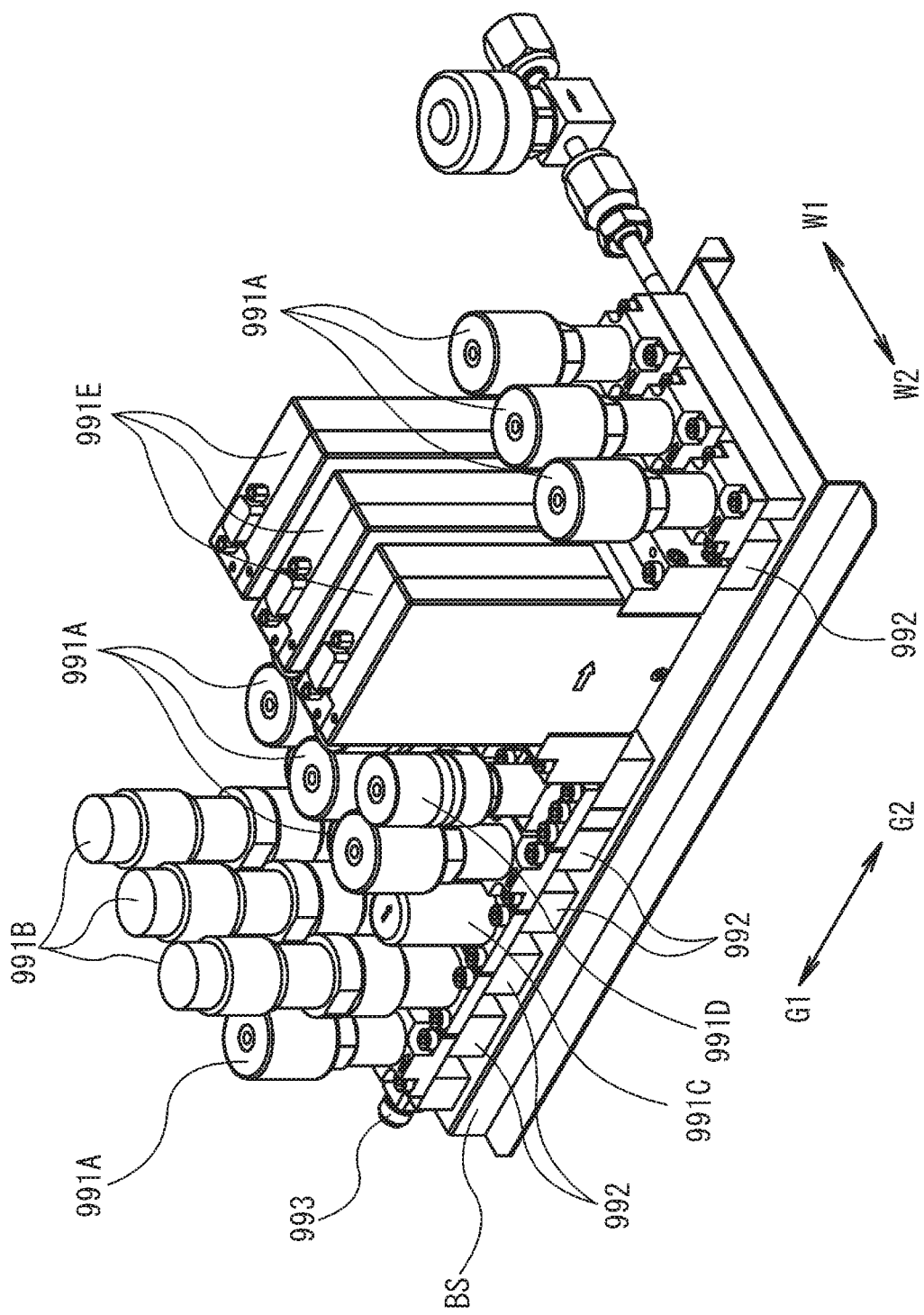

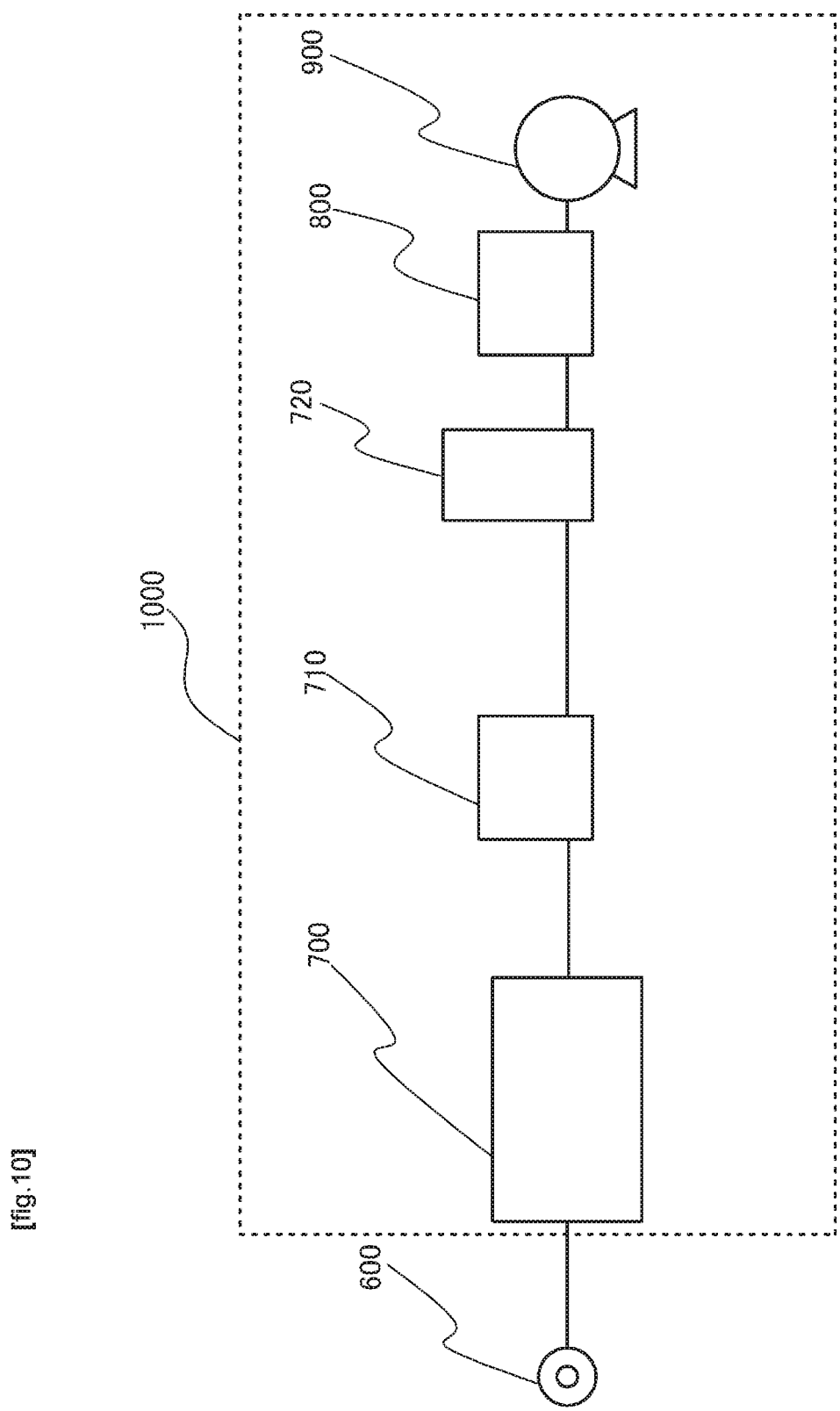

FLOW PATH ASSEMBLY AND VALVE DEVICE

TECHNICAL FIELD

The present invention relates to a flow path assembly and a valve device, a flow rate control device, a fluid control device, a flow rate control method, a semiconductor manufacturing apparatus, and a semiconductor manufacturing method using the same.

BACKGROUND ART

In various manufacturing processes such as semiconductor manufacturing processes, a fluid control device in which various fluid devices such as an open-close valve, a regulator, a mass flow controller, and the like are integrated is used in order to supply accurately measured process gases to a processing chamber.

In such a fluid control device as described above, integration is realized by arranging an installation block (hereinafter referred to as a base block) in which a flow path is formed along the longitudinal direction of the base plate instead of a pipe joint, and installing a plurality of fluid devices, including a joint block to which pipe joints and various fluid devices are connected, and the like on the base block (for example, refer to Patent Document 1).

PATENT LITERATURE

PTL 1: Japanese Laid-Open Patent Application No. 2007-3013
PTL 2: U.S. Pat. No. 4,137,267
PTL 3: Japanese Laid-Open Patent Application No. 2010-190430

SUMMARY OF INVENTION

Technical Problem

Controlling the supply of process gases in various manufacturing processes requires higher responsiveness and requires that the fluid control device be as compact and integrated as possible and installed closer to the processing chamber to which the fluid is supplied.

Along with the increase in size of processing objects, such as the increase in size of the diameter of the semiconductor wafer, it becomes necessary to also increase the supply flow rate of the fluid supplied from the fluid control device into the processing chamber.

In addition, in order to improve the responsiveness of the supply control of the process gas, shortening of the flow path is indispensable, and a technique of integrating functional components such as orifices and filters into the valve body of the valve device has also been proposed (see Patent Literatures 2 and 3, etc.).

When functional components such as orifices and filters are integrated in the flow path of the valve body of the valve device, a technique for reliably sealing the space between the member defining the flow path and the functional components such as the orifice and the filter for a long period of time is required.

It is an object of the present invention to provide a flow path assembly incorporating functional components such as orifices and filters, wherein the functional components and the flow path components defining the flow path are reliably sealed for a long period of time.

It is another object of the present invention to provide a valve device, a flow rate control device, a fluid control device, a flow rate control method, a semiconductor manufacturing device, and a semiconductor manufacturing method in which the above-mentioned flow path assembly is incorporated in a valve body to form a part of the flow path.

Solution to Problem

The flow path assembly of the present invention is a flow path assembly comprising first and second metallic flow path members defining a fluid flow path connected to each other and a plate-like member provided between the first and second flow path members and having an acting part providing a specific action on a fluid flowing through the fluid flow path are integrated, the first and second flow path members being disposed around the opening of the fluid flow path and having annular opposing surfaces opposing each other across the plate-like member, the flow path assembly further comprising an annular elastic member interposed between the first and second flow path members on the outer side of the opposing surface, one of the first and second flow path members having a caulking portion for integrating the first and second flow path members and the plate-like member and for exerting a force on the other of the first and second flow path members so that one of the opposing surfaces faces the other of the opposing surfaces to seal a gap between the plate-like member and the opposing surface, and the elastic member being crushed between the first and second flow path members by receiving a force from the caulking portion, to seal a gap between the first and second flow path members.

Preferably, the elastic member may be disposed at a position in direct contact with the caulking portion. In addition, the restoring force of the elastic member acting on the first and second flow path members may act as a part of a force for sealing a gap between the plate-like member and the opposing surface.

More preferably, the acting part may be configured to include an orifice.

The valve device of the present invention is a valve device comprising a block-shaped valve body defining opposing top and bottom surfaces and side surfaces extending between the top and bottom surfaces, the valve body defining an accommodation recess opening at the top surface and containing a valve element, a primary flow path connected to the accommodation recess, and a secondary flow path connected to the accommodation recess, the valve element comprising a valve seat having an annular seating surface formed on one end surface, an annular sealing surface formed on the other end surface, and a flow passage formed inside the seating surface and the sealing surface and passing from the one end surface to the other end surface, a valve seat support having a support surface against which a sealing surface of the valve seat abuts to support a pressing force from the sealing surface, and a diaphragm provided to be in contact with and spaced apart from the seating surface of the valve seat supported by the valve seat support, the diaphragm making a flow passage of the valve seat and the secondary flow path communicate through a gap between the diaphragm and the seating surface of the valve seat, the valve seat support having a sealing surface that cooperates with a part of the inner wall surface of the accommodation recess to block the communication between the primary flow path and the secondary flow path, and a detour passage for connecting the primary flow path with the flow passage of the valve seat, the valve seat support comprising a flow path assembly which includes:

first and second flow path members made of metal and defining fluid flow paths connected to each other; and a plate-like member provided between the first and second flow path members, having an acting part providing a specific action on the fluid flowing through the fluid flow path and integrated with the first and second flow path members, the first and second flow path members being disposed around the opening of the fluid flow path and having annular opposing surfaces opposing each other across the plate-like member, the flow path assembly further including an annular elastic member interposed between the first and second flow path members on the outer side of the opposing surface, one of the first and second flow path members having a caulking portion for integrating the first and second flow path members and the plate-like member and for exerting a force on the other of the first and second flow path members so that one of the opposing surfaces faces the other of the opposing surfaces to seal a gap between the plate-like member and the opposing surface, and the elastic member being crushed between the first and second flow path members by receiving a force from the caulking portion, to seal a gap between the first and second flow path members.

The flow rate control device of the present invention is a flow rate control device for controlling the flow rate of a fluid, comprising the valve device as described above.

The flow rate control method of the present invention uses a fluid control device including a valve device having the above-described configuration for controlling the flow rate of a fluid.

The fluid control device of the present invention is a fluid control device comprising a plurality of fluid devices that are arranged, the plurality of fluid devices including the valve device described above.

The semiconductor manufacturing method of the present invention, comprises using the above-mentioned valve device for controlling the flow rate of the process gas in a manufacturing process of a semiconductor device requiring a process step using the process gas in a sealed chamber.

The semiconductor manufacturing apparatus of the present invention comprises a fluid control device for supplying a process gas to a processing chamber, the fluid control device comprising a plurality of fluid devices, and the fluid devices include the valve device as described above.

Advantageous Effects of Invention

According to the present invention, by providing the elastic member, the outer side of the opposing surface is further sealed in addition to sealing between the opposing surfaces of the first and second flow path members, so that the member interposed by the plate-like member can be reliably sealed for a long period of time.

BRIEF DESCRIPTION OF DRAWINGS

FIG. 1A is a front view including a longitudinal section in a portion of a valve device according to an embodiment of the present disclosure.

FIG. 1B is a top view of the valve device in FIG. 1A.

FIG. 1C is a bottom view of the valve device in FIG. 1A.

FIG. 1D is a side view of the valve device in FIG. 1A.

FIG. 2 is a sectional view of the inner disk.

FIG. 3 is a sectional view of the valve seat.

FIG. 4A is an enlarged sectional view of a main part of the valve device of FIG. 1A, showing the valve element in closed condition.

FIG. 4B is an enlarged sectional view of a main part of the valve device of FIG. 1A, showing the valve element in opened condition.

FIG. 5 is an enlarged sectional view of a flow path assembly according to an embodiment of the present invention incorporated in a valve device of FIG. 1A.

FIG. 6 is an enlarged sectional view of a flow path assembly according to another embodiment of the present invention.

FIG. 7 is an enlarged sectional view of a flow path assembly according to still another embodiment of the present invention.

FIG. 8 is an enlarged sectional view showing an example of a flow path assembly without an elastic member.

FIG. 9 is a perspective view showing an example of a fluid control device using a valve device according to an embodiment of the present invention.

FIG. 10 is a schematic diagram showing an example of a semiconductor manufacturing apparatus to which a valve device according to an embodiment of the present invention is applied.

DESCRIPTION OF EMBODIMENTS

Embodiments of the present invention will be described below with reference to the drawings. In the present specification and the drawings, the same reference numerals are used to denote components having substantially the same functions, and thus a repetitive description thereof is omitted.

FIG. 1A to FIG. 1E show the structure of the valve device according to an embodiment of the present invention, FIG. 2 shows the sectional structure of the inner disk, FIG. 3 shows the sectional structure of the valve seat, and FIG. 4A and FIG. 4B show the operation of the valve device.

In FIG. 1A to FIG. 4B, it is assumed that arrows A1 and A2 in the drawing indicate the vertical direction. A1 indicates the upward direction, and A2 indicates the downward direction. Arrows B1 and B2 indicate the longitudinal direction of the valve body 20 of the valve device 1, and B1 indicates one end side and B2 indicates the other end side. It is assumed that C1 and C2 indicate the width directions orthogonal to the longitudinal directions B1 and B2 of the valve body 20, and C1 indicates the front side and C2 indicates the back side.

The valve body 20 is a block-shaped member having a rectangular shape in a top view, and defines a top surface 20/1 and a bottom surface 20/2, and four side surfaces 20/3 to 20/6 extending between the top surface 20/1 and the bottom surface 20/2. In addition, it defines a accommodation recess 22 which opens at the top surface 20/1. A valve element 2, which will be described later, is incorporated in the accommodation recess 22.

As can be seen from FIG. 4A and the like, the accommodation recess 22 is composed of inner peripheral surfaces 22a, 22b, and 22c having different diameters and a bottom surface 22d. The diameter of the inner peripheral surfaces 22a, 22b, and 22c decreases in this order.

The valve body 20 defines a primary flow path 21 and secondary flow paths 24A, 24B connected to the accommodation recess 22. The primary flow path 21 is a flow path on a side to which a fluid such as a gas is supplied from the outside. The secondary flow paths 24A and 24B are flow paths for allowing a fluid such as a gas flowing in from the primary flow path 21 through the valve element 2 to flow out to the outside.

The primary flow path 21 is formed to be inclined with respect to the bottom surface 20f2 of the valve body 20, and has one end connected to the bottom surface 22d of the accommodation recess 22, and the other end opened at the bottom surface 20f2.

A seal holding portion 21a is formed around the opening on the bottom surface 20f2 side of the primary flow path 21. In the seal holding portion 21a, a gasket is disposed as a sealing member. The valve body 20 is connected to another flow path block (not shown) by screwing a fastening bolt into the screw hole 20h1. At this time, since the gasket held by the seal holding portion 21a is crushed by the fastening force of the fastening bolt between the gasket and another flow path block (not shown), the periphery of the opening on the bottom surface 20f2 side of the primary flow path 21 is sealed.

Examples of the gasket include gaskets made of metal or resin. Examples of the gasket include a soft gasket, a semi-metal gasket, and a metal gasket. Specifically, the following is suitably used.
(1) Soft gasket
  Rubber O-ring
  Rubber seat (for full seating)
  Joint seat
  Expanded graphite sheet
  PTFE sheet
  PTFE jacketed type
(2) Semi-metal gasket
  Spiral-wound gasket
  Metal jacket gasket
(3) Metal gasket
  Solid-metal flat gasket
  Metal hollow O-ring
  Ring joint The same applies to the seal holding portions 25a and 26b provided around the openings of the branch flow paths 25 and 26, which will be described later, and a detailed description thereof is omitted.

The secondary flow path 24 includes two secondary flow paths 24A and 24B formed on opposite sides with respect to the accommodation recess 22 in the longitudinal directions B1 and B2 of the valve body 20. The secondary flow paths 24A and 24B are formed on a common axis J1 extending in the longitudinal directions B1 and B2 of the valve body 20.

One end of the secondary flow path 24A is opened at the inner peripheral surface 22b of the accommodation recess 22, and the other end 24a1 is closed inside the valve body 20.

One end of the secondary flow path 24B is opened on the inner peripheral surface 22b of the accommodation recess 22, and the other end 24b1 is opened on the side surface 20f6.

The opening of the side surface 20f6 of the secondary flow path 24B is provided with a blocking member 30 by means of welding or the like, and the opening of the secondary flow path 24B is blocked.

The secondary flow path 24 can be easily formed by machining using a tool such as a drill.

In the valve device 1 according to the present embodiment, a fluid such as a gas flowing into the primary flow path 21 can be divided into four by the branch flow paths 25 and 26 of the secondary flow path 24.

Each of the valve elements 2 has a diaphragm 14, an inner disk 15, a valve seat 16, and a valve seat support 50 composed of a flow passage assembly, which will be described later. In the following, the valve seat support 50 will also be referred to as a flow path assembly 50.

As shown in FIG. 4A, the outer peripheral surface 50b1 of the valve seat support 50 is fitted and inserted into the inner peripheral surface 22c of the accommodation recess 22. The flow path assembly constituting the valve seat support 50 will be described in detail later. In the valve seat support 50, a detour passage 50a is formed at the center, and an annular support surface 50f1 centered on the detour passage 50a is formed at the upper end surface. The support surface 50f1 of the valve seat support 50 is formed of a flat surface, and a step is formed on an outer peripheral portion of the support surface 50f1. The outer peripheral surface 50b1 of the valve seat support 50 has a diameter to fit into the inner peripheral surface 22c of the accommodation recess 22, and there is a step between the outer peripheral surface 50b2 which is reduced in diameter of the lower end side. An annular end surface 50b3 is formed by the step. As shown in FIG. 4A or the like, a sealing member 55 made of a resin such as PTFE or the like is fitted into the outer peripheral surface 50b2. The sealing member 55 is formed to have a rectangular cross-sectional shape and has a size such that it is crushed between the bottom surface 22d of the accommodation recess 22 and the end surface 50b3 of the valve seat support 50. When the sealing member 55 is crushed between the bottom surface 22d of the accommodation recess 22 and the end surface 50b3 of the valve seat support 50, resin enters between the outer peripheral surface 50b1 of the valve seat support 50 and the inner peripheral surface 22c and the bottom surface 22d of the accommodation recess 22, and the space between the valve seat support 50 and the accommodation recess 22 is reliably sealed. That is, the outer peripheral surface 50b2 and the end surface 50b3 serving as sealing surfaces cooperate with the inner peripheral surface 22c and the bottom surface 22d of the accommodation recess 22 to block the communication between the primary flow path 21 and the secondary flow path 24.

The detour passage 50a of the valve seat support 50 is connected to the primary flow path 21 that opens at the bottom surface 22d of the accommodation recess 22.

A valve seat 16 is provided on a support surface 50f1 of the valve seat support 50.

The valve seat 16 is formed of a resin such as PFA or PTFE so as to be elastically deformable, and, as shown in FIG. 3, the valve seat 16 is formed in an annular shape, and an annular seating surface 16s is formed on one end surface, and an annular sealing surface 16f is formed on the other end surface. Inside the seating surface 16s and the sealing surface 16f, a flow passage 16a formed of a through hole is formed. The valve seat 16 has a small diameter portion 16b1 and a large diameter portion 16b2 on the outer peripheral side thereof, and a step portion is formed between the small diameter portion 16b1 and the large diameter portion 16b2.

The valve seat 16 is positioned with respect to the support surface 50f1 of the valve seat support 50 by the inner disk 15 as a positioning and pressing member, and is pressed toward the support surface 50f1 of the valve seat support 50. Specifically, a large diameter portion 15a1 and a small diameter portion 15a2 formed in the center portion of the inner disk 15 are formed, and a step surface 15a3 is formed between the large diameter portion 15a1 and the small diameter portion 15a2. An annular flat surface 15f1 is formed on one end surface side of the inner disk 15. An annular flat surface 15f2 is formed on the outer side on the other end surface side of the inner disk 15, and an annular flat surface 15f3 is formed on the inner side. The flat surface 15f2 and the flat surface 15f3 have different heights, and the flat surface 15f3 is positioned closer to the flat surface 15f1. An outer peripheral surface 15b that fits into the inner peripheral surface 22a of the accommodation recess 22 is formed on the outer peripheral side of the inner disk 15. Further, a plurality of flow paths 15h passing from one end surface to the other end surface are formed at equal intervals in the circumferential direction. The large diameter portion 16b2 and the small diameter portion 16b1 of the valve seat 16 are fitted to the large diameter portion 15a1 and the small diameter portion 15a2 of the inner disk 15, whereby the valve seat 16 is positioned with respect to the support surface 50f1 of the valve seat support 50.

The flat surface 15f2 of the inner disk 15 is disposed on a flat step surface formed between the inner peripheral surface 22a and the inner peripheral surface 22b of the accommodation recess 22. A diaphragm 14 is disposed on a flat surface 15f1 of the inner disk 15, and a holding ring 13 is disposed on the diaphragm 14.

The actuator 10 is driven by a driving source such as a pneumatic pressure and drives the diaphragm presser 12 movably held in the vertical directions A1 and A2. As shown in FIG. 1A, the tip end portion of the casing 11 of the actuator 10 is screwed into and fixed to the valve body 20. The tip end portion presses the holding ring 13 in downward direction A2, and the diaphragm 14 is fixed in the accommodation recess 22. The diaphragm 14 seals the accommodation recess 22 on the opening side. In addition, the inner disk 15 is also pressed in downward direction A2. The height of the step surface 15a3 is set so that the step surface 15a3 presses the valve seat 16 toward the support surface 50f1 of the valve seat support 50 in a state in which the flat surface 15f2 of the inner disk 15 is pressed against the step surface of the accommodation recess 22. The flat surface 15f3 of the inner disk 15 does not abut against the upper end surface of the valve seat support 50.

The diaphragm 14 has a diameter larger than the diameter of the valve seat 16, and is formed of a metal such as stainless steel and a NiCo based alloy, or fluorinated resin in a spherical shell shape so as to be elastically deformable. The diaphragm 14 is supported by the valve body 20 so as to be able to abut against and separate from the seating surface 16s of the valve seat 16.

In FIG. 4A, the diaphragm 14 is pressed and elastically deformed by the diaphragm presser 12, and is pressed against the seating surface 16s of the valve seat 16. The valve element 2 is in the closed state.

When the diaphragm 14 is pressed against the seating surface 16s of the valve seat 16, the flow path between the primary flow path 21 and the secondary flow path 24 is closed. When the diaphragm 14 of the valve element 2 is released from being pressed by the diaphragm presser 12, the valve element 2 is restored to a spherical shell shape as shown in FIG. 4B. When the diaphragm presser 12 is moved upward A1, the diaphragm 14 moves away from the seating surface 16s of the valve seat 16, as shown in FIG. 4B. Then, a fluid such as a process gas supplied from the primary flow path 21 flows through a gap between the diaphragm 14 and the seating surface 16s of the valve seat 16 into the secondary flow path 24. The fluid eventually flows out of the valve body 20 through the branch flow paths 25 and 26. That is, the fluid is divided into four.

FIG. 5 shows the flow path assembly that comprises the valve seat support 50 described above.

The flow path assembly 50 includes flow path members 51 and 52, an orifice plate 53 as a plate-like member provided between the flow path members 51 and 52, and an annular elastic member 54 interposed between the flow path members 51 and 52.

The flow path member 51 is formed of a cylindrical member made of metal in which a fluid flow path 51a being a through hole is formed at the center, and a protruding portion 51t is formed on the outer peripheral surface 51b in the circumferential direction.

The flow path member 52 is formed of a closed cylindrical member made of metal in which a fluid flow path 52a being a through hole is formed at a central portion, and a caulking portion 52e-c is formed at a tip end portion of the cylindrical portion 52e. In FIG. 5, the caulking portion 52e-c shows a state after plastic deformation, and although not shown in the figure before plastic deformation, the caulking portion 52e-c is located at a position away from the lower inclined surface portion 51t2 of the protruding portion 5t.

The orifice plate 53 is made of a disk-shaped member made of metal, and an orifice 53a is formed at the center. The orifice 53a is provided to allow a fluid flowing through the fluid flow paths 51a and 52a to pass therethrough. The orifice 53a acts as a resistance to fluid flow and creates a pressure difference between the fluid flow path 51a side and the fluid flow path 52a side.

The flow path members 51 and 52 and the orifice plate 53 may be formed of the same type of metal material such as a stainless steel alloy, or may be formed of different metal materials.

The outer peripheral surface 51e on the upper end side of the flow path member 51 and the inner peripheral surface 52e1 formed in the vicinity of the root of the cylindrical portion 52e of the flow path member 52 are formed so as to fit with each other, whereby the central axes of the fluid flow paths 51a and 52a are aligned.

The flow path member 51 and the flow path member 52 are formed with annular opposing surfaces 51f and 52f facing each other. The opposing surfaces 51f and 52f are formed around the openings of the fluid flow paths 51a and 52a, and are arranged concentrically with the central axes of the fluid flow paths 51a and 52a. The opposing surfaces 51f and 52f are flat surfaces, and annular protrusions 51p and 52p are formed at positions corresponding to each other from the opposing surfaces 51f and 52f. The annular protrusions 51p and 52p are crushed by receiving a force when the caulking portion 52e-c is caulked, and they seal gap between the opposing surfaces 51f and 52f and the orifice plate 53.

The outer peripheral surface 51e and the upper end surface 51t1 of the protruding portion 51t of the flow path member 51 and the inner peripheral surface 52e2 and the lower end surface 52e3 of the flow path member 52 define an accommodation space for accommodating the annular elastic member 54. The accommodation space has a shape that matches the substantially rectangular cross-sectional shape of the elastic member 54. The volume of the accommodation space is reduced by plastically deforming the caulking portion 52e-c, and the elastic member 54 is formed so as to be crushed by the upper end surface 51t1 and the lower end surface 52e3. Specifically, when the caulking portion 52e-c is deformed inward, the caulking portion 52e-c engages with the lower inclined surface portion 51t2 of the protruding portion 51t. As a result, the caulking portion 52e-c exerts a force on the flow path members 51 and 52 such that one of the opposing surfaces 51f and 52f faces the other of the opposing surfaces 51f and 52f, that is, such that the opposing surface 51f approaches the opposing surface 52f. As a result, the elastic member 54 comes into close contact with the outer peripheral surface 51e of the flow path member 51 and the upper end surface 51t1 of the protruding portion 51t, the inner peripheral surface 52e2 and the lower end surface 52e3 of the flow path member 52, and seals the space between the flow path member 51 and the flow path member 52.

The elastic member 54 is formed of a resin material such as, but not limited to, a PEEK resin (polyetheretherketone) or a polyimide resin.

As described above, the space between the fluid flow path 51a and the fluid flow path 52a is sealed by the annular protrusions 51p and 52p of the opposing surfaces 51f and 52f, and is also sealed by the elastic member 54 on the outer side of the opposing surfaces 51f and 52f.

Here, an example of a flow path assembly 500 without an elastic member 54 is shown in FIG. 8. In FIG. 8, the same reference numerals are used for components similar to those of FIG. 5. By the force exerted by the caulking portion 520e-c of the upper flow path member 520, the space between the lower flow path member 51 and the upper flow path member 520 is sealed only at the annular protrusions 51p and 52p of the opposing surfaces 51f and 52f. If leakage occurs in the seal portion and the fluid flows out to the outside of the opposing surfaces 51f and 52f, the fluid flows out through the space between the outer peripheral surface 51e and the inner peripheral surface 520e1.

On the other hand, in the flow path assembly 50 according to the present embodiment shown in FIG. 5, even if leakage occurs in the annular protrusions 51p and 52p of the opposing surfaces 51f and 52f, the fluid can be surely prevented from flowing out by the sealing provided by the elastic member 54.

Second Embodiment

FIG. 6 shows a flow path assembly 50B according to another embodiment of the present invention. In FIG. 6, the same reference numerals are used for components similar to those of FIG. 5.

In FIG. 6, a protruding portion 51s is circumferentially formed on the outer peripheral surface 51Bb of the flow path member 51B. An elastic member 54 is provided between the lower end surface 51s1 of the protruding portion 51s, the outer peripheral surface 51Bb of the flow path member 51B, and the caulking portion 52e-c of the flow path member 52. The elastic member 54 is disposed at a position in direct contact with the caulking portion 52e-c, and is deformed by a force from the caulking portion 52e-c to have a substantially triangular cross-sectional shape, but the cross-sectional shape before deformation is a substantially rectangular shape.

As shown in the drawing, the elastic member 54 constantly receives the force F from the caulking portion 52e-c. The annular protrusions 51p and 52p are crushed by the force F. and seal gaps between the opposing surfaces 51f and 52f and the orifice plate 53. Further, when the elastic member 54 is crushed by the caulking portion 52e-c, the elastic member 54 comes into close contact with the lower end surface 51s, the outer peripheral surface 51Bb, and the caulking portion 52e-c. As a result, the gap between the flow path member 51B and the flow path member 52 is sealed in the same manner as in the above embodiment.

The important point here is that the elastic member 54 is directly crushed by the caulking portion 52e-c, so that the restoring force of the elastic member 54 constantly acts on the flow path member 51B and the flow path member 52.

A part of the reaction force R that the caulking portion 52e-c receives from the elastic member 54 is a restoring force of the elastic member 54. Assuming that the vertical component and the horizontal component of the reaction force R are Rv and Rh, the vertical component Rv acts as a sealing force with which the annular protrusions 51p and 52p seal the gaps between the opposing surfaces 51f and 52f and the orifice plate 53. Since the restoring force of the elastic member 54 is included in the vertical component Rv, the sealing force can be stabilized for a long period of time.

Third Embodiment

FIG. 7 shows a flow path assembly 50C according to another embodiment of the present invention. In FIG. 7, the same reference numerals are used for components similar to those of FIG. 6.

The flow path member SiC shown in FIG. 7 does not include a protrusion that receives a caulking force on the outer peripheral surface 51Cb.

The elastic member 54 is crushed between the caulking portion 52Be_c formed at the tip end of the cylindrical portion 52Be of the upper flow path member 52B, the lower end surface 52Be1 of the cylindrical portion 52Be, and the outer peripheral surface 51Cb of the flow path member 51C, and the gap between the flow path member 51C and the flow path member 52B is sealed. Further, similarly to the second embodiment, the restoring force of the elastic member 54 acts as a part of the sealing force by which the annular protrusions 51p and 52p seal the gaps between the opposing surfaces 51f and 52f and the orifice plate 53.

As described above, various embodiments have been described, but the present invention is not limited to these embodiments.

In the above embodiment, the secondary flow path 24 is branched into a plurality in the valve body 20, the case where the branch flow paths 25 and 26 open at the top surface 20f1 of the valve body 20 has been exemplified, the present invention is not limited thereto, and a configuration in which they open at the bottom surface 20f2 or any of the side surfaces 20f3 to 20f6 can also be adopted.

In the above embodiment, the inner disk 15 and the valve seat 16 are separate members, but it is also possible to integrate the inner disk 15 and the valve seat 16.

In the above embodiment, the flow path 21 is the primary side, and the flow paths 24A and 24B are the secondary side, however, the present invention is not limited to this, and the flow path 21 may be the secondary side, and the flow paths 24A and 24B may be the primary side.

In the above embodiment, the case where the flow path assembly is used as the valve seat support is exemplified, but the present invention is not limited to this, and can be applied to a flow path other than a valve device.

In the above embodiment, the orifice plate is exemplified as the plate-like member, but the present invention is not limited to this, and for example, a filter plate having a filter acting portion as the plate-like member may be employed.

Referring to FIG. 9, an exemplary fluid control device to which the valve device 1 according to the above embodiment is applied will be described.

The fluid control device shown in FIG. 9 is provided with metallic baseplates BS arranged along the widthwise directions W1. W2 and extending in the longitudinal directions G1, G2. Note that W1 represents the front side. W2 represents the back side, G1 represents the upstream side, and G2 represents the downstream side. Various fluid devices 991A to 991E are installed on the base plate BS via a plurality of flow path blocks 992, and a flow path (not shown) through which a fluid flows from the upstream side G1 toward the downstream side G2 is formed by the plurality of flow path blocks 992.

Here, a "fluid device" is a device used in a fluid control device for controlling a flow of a fluid, and includes a body defining a fluid flow path, and has at least two flow path ports opening at a surface of the body. Specific examples include, but are not limited to, an open-close valve (two-way valve) 991A, a regulator 991B, a pressure gauge 991C, an open-close valve (three-way valve) 991D, a mass flow controller 991E which is a flow rate control device, and the like. The introducing pipe 993 is connected to a flow passage port on the upstream side of the flow passage (not shown) described above.

The valve device 1 according to the present embodiment is applicable to the mass flow controller 991E described above, and the flow rate of the fluid is controlled by the mass flow controller 991E. The valve device 1 according to the present embodiment can be applied to valves such as an open-close valve (two-way valve) 991A, a regulator 991B, a pressure gauge 991C, and an open-close valve (three-way valve) 991D.

Next. FIG. 10 shows an example of a semiconductor manufacturing apparatus to which the above-described fluid control device is applied.

A semiconductor manufacturing apparatus 1000 is a system for performing a semiconductor manufacturing process using atomic layer deposition (ALD: Atomic Layer Deposition method), where 600 is a process gas supply source. 700 is a gas box, 710 is a tank, 800 is a processing chamber, and 900 is an exhaust pump. The fluid control device shown in FIG. 7 is housed in a gas box 700.

In a treatment process that deposits a film on a substrate, in order to stably supply a process gas, a process gas supplied from a gas box 700 is temporarily stored in a tank 710 as a buffer, and a valve 720 provided in the immediate vicinity of the processing chamber 800 is opened and closed at high frequency to supply the process gas from the tank to the processing chamber of a vacuum atmosphere.

The ALD method is one of chemical vapor deposition methods, in which two or more types of process gases are alternately flowed on the substrate surface under film forming conditions such as temperature and time to react with atoms on the substrate surface to deposit a film layer by layer. This method allows control per atom layer, making it possible to form a uniform film thickness and grow the film very finely, even in terms of film quality.

In the semiconductor manufacturing process by the ALD method, it is necessary to precisely adjust the flow rate of the processing gas, and it is also necessary to secure the flow rate of the processing gas to some extent by increasing the diameter of the substrate or the like.

A gas box 700 containing a fluid control device provides an accurately metered amount of process gas to the processing chamber 800. The tank 710 functions as a buffer for temporarily storing the process gas supplied from the gas box 700.

The processing chamber 800 provides a sealed processing space for forming a film on a substrate by an ALD method.

The exhaust pump 900 draws a vacuum in the processing chamber 800.

The present invention is not limited to the above-described embodiments. Various additions, modifications, and the like can be made by those skilled in the art within the scope of the present invention. For example, in the application example described above, the valve device 1 is used in a semiconductor manufacturing process by the ALD method, but the present invention is not limited to this, and the present invention can be applied to any object requiring precise flow rate control, such as an atomic layer etching (ALE: Atomic Layer Etching) method.

REFERENCE SIGNS LIST

1: Valve device
2: Valve element
10: Actuator
11: Casing
12: Diaphragm presser
13: Holding ring
14: Diaphragm
15: Inner disk
15a1: Large diameter portion
15a2: Small diameter portion
15a3: Step surface
15b: Outer peripheral surface
15f1 to 15f3: Flat surface
15h: Flow path
16: Valve seat
16a: Flow passage
16b1: Small diameter portion
16b2: Large diameter portion
16f: Sealing surface
16s: Seating surface
20: Valve body
20f1: Top surface
20f2: Bottom surface
20f3-20f6: Side surface
20h1: Screw hole
21: Primary flow path
21a: Seal holding portion
22: Accommodation recess
22a-22c: Inner peripheral surface
22d: Bottom surface
24, 24A. 24B: Secondary flow path
24a1, 24b1: Other end
25: Branch flow path
25a: Seal holding portion
26: Branch flow path
26b: Seal holding portion
30: blocking member
50, 50B, 50C: Flow path assembly (valve seat support)
50a: detour passage
50b1: Outer peripheral surface
50b2: Outer peripheral surface
50b3: End surface
50f1: Support surface
51: Flow path member
51B: Flow path member
51Bb: Outer peripheral surface
51C: Flow path member 51Cb: Outer peripheral surface
51a: Fluid flow path
51b, 51e: Outer peripheral surface
51f: Opposing surface
51p: Annular protrusion
51s: Protruding portion
51s1: Lower end surface
51t: Protruding portion
51t1: Upper end surface
51t2: Lower inclined surface portion
52, 52B: Flow path member
52Be: Cylindrical portion
52Be1: Lower end surface
52Be_c: Caulking portion
52a: Fluid flow path
52e: Cylindrical portion
52e1: Inner peripheral surface
52e2: Inner peripheral surface
52e3: Lower end surface
52e-c: caulking portion
52f: opposing surface
52p: annular protrusion
53: Orifice plate
53a: Orifice
54: Elastic member
55: Sealing member
500: Flow path assembly
520: Flow path member
520e 1: inner peripheral surface
520e-c: Caulking portion
700: Gas box (fluid control device)
710: Tank
720: Valve
800: Processing chamber
900: Exhaust pump
991A: open-close valve (two-way valve)
991B: Regulator
991C: Pressure gauge
991D: open-close valve (three-way valve)
991E: Mass flow controller (flow controller)
992: Flow path block
993: Introducing pipe
1000: Semiconductor manufacturing apparatus
A1, A2: Vertical direction
B1, B2: Longitudinal direction
BS: Base plate
F: force
G1, G2: Longitudinal direction
J1: Axis
R: Reaction force
Rv: Vertical Component
W1, W2: Width direction

The invention claimed is:

1. A flow path assembly comprising: a first flow path member and a second flow path member made of metal defining a fluid flow path connected to each other; and a plate-like member provided between the first flow path member and the second flow path member and having an acting part providing a specific action on a fluid flowing through the fluid flow path,
the first flow path member and the second flow path member being disposed around the opening of the fluid flow path and having annular opposing surfaces opposing each other across the plate-like member,
the flow path assembly further comprising an annular elastic member made of resin interposed between the first flow path member and the second flow path member on the outer side of the opposing surface,
one of the first flow path member and the second flow path member having a caulking member for integrating the first flow path member, the second flow path member, and the plate-like member, and for exerting a force on the other of the first flow path member and the second flow path member so that one of the opposing surfaces faces the other of the opposing surfaces to seal a gap between the plate-like member and the opposing surface, and
the elastic member being crushed between the first flow path member and the second flow path member under a force from the caulking portion to seal a gap between the first flow path member and the second flow path member.

2. The flow path assembly according to claim 1, wherein the elastic member is disposed at a position in direct contact with the caulking portion.

3. The flow path assembly according to claim 1, wherein a restoring force of the elastic member acting on the first flow path member and the second flow path member acts as part of a force for sealing a gap between the plate-like member and the opposing surface.

4. The flow path assembly according to claim 1, wherein at least one of the opposing surfaces is formed with an annular protrusion which is crushed by a force received from the caulking portion and seals a gap between the plate-like member and the opposing surface.

5. The flow path assembly according to claim 1, wherein the acting part comprises an orifice.

6. A valve device comprising a block-shaped valve body defining opposing top and bottom surfaces and side surfaces extending between the top and bottom surfaces,
the valve body defining an accommodation recess opening at the top surface and containing a valve element, a primary flow path connected to the accommodation recess, and a secondary flow path connected to the accommodation recess,
the valve element comprising:
a valve seat having an annular seating surface formed on one end surface, an annular sealing surface formed on the other end surface, and a flow passage formed inside the seating surface and the sealing surface and passing from the one end surface to the other end surface,
a valve seat support having a support surface against which the sealing surface of the valve seat abuts to support a pressing force from the sealing surface, and
a diaphragm provided to be in contact with and spaced apart from the seating surface,
the diaphragm making the flow passage and the secondary flow path communicate through a gap between the diaphragm and the seating surface,
the valve seat support having a sealing surface for blocking the communication between the primary flow path and the secondary flow path in cooperation with a part of the inner wall surface of the accommodation recess, and a detour passage for connecting the primary flow path with the flow passage,
the valve seat support comprising a flow path assembly which includes:
a first flow path member and a second flow path member made of metal defining a fluid flow path connected to each other, and a plate-like member provided between the first flow path member and the second flow path member and having an acting part providing a specific action on a fluid flowing through the fluid flow path, the first flow path member and the second flow path member being disposed around the opening of the fluid flow path and having annular opposing surfaces opposing each other across the plate-like member, the flow path assembly further including an annular elastic member interposed between the first flow path member and the second flow path member on the outer side of the opposing surface, one of the first flow path member and the second flow path member having a caulking portion for integrating the first flow path member, the second flow path member, and the plate-like member, and for exerting a force on the other of the first flow path member and the second flow path member so that one of the opposing surfaces faces the other of the opposing surfaces to seal a gap between the plate-like member and the opposing surface, and the elastic member being crushed between the first flow path member and the second flow path member by receiving a force from the caulking portion, to seal a gap between the first flow path member and the second flow path member.

7. A flow rate control device for controlling a flow rate of a fluid, comprising the valve device as claimed in claim 6.

* * * * *